United States Patent
Li (10) Patent No.: US 10,365,173 B2
(45) Date of Patent: Jul. 30, 2019

(54) SIGNAL PROCESSING CIRCUIT AND METHOD WITH PRESSURE-SENSITIVE SENSOR ARRAY

(71) Applicant: CHIPSEA TECHNOLOGIES (SHENZHEN) CORP., Shenzhen, Guangdong (CN)

(72) Inventor: Xiao Li, Guangdong (CN)

(73) Assignee: CHIPSEA TECHNOLOGIES (SHENZHEN) CORP., Shenzhen, Guangdong (CN)

( * ) Notice: Subject to any disclaimer, the term of this patent is extended or adjusted under 35 U.S.C. 154(b) by 321 days.

(21) Appl. No.: 15/389,507

(22) Filed: Dec. 23, 2016

(65) Prior Publication Data

US 2017/0102275 A1  Apr. 13, 2017

(30) Foreign Application Priority Data

Jan. 1, 2016  (CN) .......................... 2016 1 0006038

(51) Int. Cl.
| | |
|---|---|
| G01L 1/18 | (2006.01) |
| G01L 1/14 | (2006.01) |
| G01L 1/16 | (2006.01) |
| G01L 9/06 | (2006.01) |
| G01L 9/08 | (2006.01) |
| G01L 9/12 | (2006.01) |

(52) U.S. Cl.
CPC .................. *G01L 1/18* (2013.01); *G01L 1/14* (2013.01); *G01L 1/144* (2013.01); *G01L 1/16* (2013.01); *G01L 9/06* (2013.01); *G01L 9/08* (2013.01); *G01L 9/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,565,097 A * | 1/1986 | Dimeff | .................... | G01L 9/045 323/367 |
| 6,147,312 A * | 11/2000 | Lockery | ................. | G01G 3/142 177/211 |
| 2002/0134163 A1* | 9/2002 | Clifford | .............. | G01L 19/0038 73/715 |
| 2007/0107494 A1* | 5/2007 | Rezgui | ................ | G01L 19/0046 73/29.03 |
| 2013/0145854 A1* | 6/2013 | Bemis | ..................... | G01L 9/045 73/720 |

\* cited by examiner

*Primary Examiner* — Andre J Allen (57) ABSTRACT

A signal processing circuit with a pressure-sensitive sensor array includes a pressure-sensitive sensor array with M rows and N columns, and an excitation source adapted for outputting positive and negative excitation voltages, wherein: the positive output terminals of the sensing units at a same row of the pressure-sensitive sensor array are connected with each other and act as an output of the row; the negative output terminals of the sensing units at a same column of the pressure-sensitive sensor array are connected with each other and act as an output of the column; so that the whole pressure-sensitive sensor array has a positive excitation input end, a negative excitation input end, M row output signals and N column output signals. The signal processing circuit and method are capable of significantly decreasing an amount of output signal wires of the sensor, reducing connection areas, and improving reliability.

1 Claim, 6 Drawing Sheets

Fig. 1

(Prior Art)

SIGNAL PROCESSING CIRCUIT AND METHOD WITH PRESSURE-SENSITIVE SENSOR ARRAY

CROSS REFERENCE OF RELATED APPLICATION

The present invention claims priority under 35 U.S.C. 119(a-d) to CN 201610006038.9, filed Jan. 1, 2016.

BACKGROUND OF THE PRESENT INVENTION

Field of Invention

The present invention relates to the field of signal processing, and more particularly to a signal processing circuit and method with a pressure-sensitive sensor array.

Description of Related Arts

The pressure-sensitive sensor is adapted for converting the externally applied pressure into electrical signals. It comprises resistive pressure-sensitive sensor, capacitive pressure-sensitive sensor and piezoelectric pressure-sensitive sensor. The resistive sensor is made from early metal sheet electric resistance strain gauges to existing composite materials and nano-materials (graphene). Correspondingly, the size becomes smaller and smaller. Therefore, the scope of application of the pressure-sensitive sensor is gradually expanded.

For example, the touch key, comprising the conventional pressure-sensitive sensor made from composite materials, is applied to household electrical appliances and other fields, for replacing traditional mechanical key. It has some advantages such as long service life, good looking appearance, and multiple functions able to be realized. Generally, in order to obtain excellent signal quality, the pressure-sensitive sensor is in a bridge form on electrical properties, so as to convert the pressure signal to the differentially electrical signal. However, every bridge has a corresponding differential signal pair, so that for manufacturing a large press key array, connection wires of the signals become more. For example, the 4×3 keyboard has 24 signal wires and 2 excitation signals, so that the wire area is increased, which makes against reducing the product size, reduces reliability, and simultaneously needs subsequent signal processing chips to increase input channels, thereby increasing manufacturing cost.

For example, Chinese Patent CN 200710087168.0 disclosed a method for constructing a fingerprint image input apparatus through a pressure-sensitive sensor, which comprises steps of: firstly respectively horizontally and vertically arranging multiple pressure-sensitive sensors, whose contact surface maximum radius is less than fingerprint single gully width, on an insulation board whose area is larger than a singer area, obtaining an array formed by the multiple pressure-sensitive sensors, wherein: every sensor produces a strongly electrical signal while being trigger by pressure, the sensors without pressure do not produce electrical signals; when a finger is placed on the sensor array, the protruding part of the finger fingerprint will trigger the sensor, the sensor produces the strongly electrical signals. Because every sensor in the sensor array represents one pixel point in a fingerprint image, the strong and weak signals produced by the sensor array form a binaryzation fingerprint image. In spite of resolving problems through the pressure-sensitive sensor array, the method do not treat the signal connection wires, so that the signal connection wires adopted by the pressure-sensitive sensor array are still more, thus the wire area is larger, which makes against reducing production size and simultaneously decreasing reliability of the wires, and increasing manufacturing cost.

SUMMARY OF THE PRESENT INVENTION

An object of the present invention is to provide a signal processing circuit and method with a pressure-sensitive sensor array for resolving the above problems, which are capable of effectively decreasing an amount of signal wires, improving reliability and reducing cost.

Another object of the present invention is to provide a signal processing circuit and method with a pressure-sensitive sensor array, which are capable of significantly decreasing an amount of output signal wires of the sensors, reducing connection areas, inputting channels of subsequent chips, conversion times from analog signals to digital signals, and manufacturing cost and volume of the whole system.

Accordingly, in order to accomplish the above objects, technical solutions of the present invention are as follows.

A signal processing circuit with a pressure-sensitive sensor array comprises: a pressure-sensitive sensor array with M rows and N columns (wherein at least one of M and N is larger than one), and an excitation source adapted for outputting positive and negative excitation voltages, wherein:

the pressure-sensitive sensor array comprises M×N sensing units which are connected with each other through a bridge manner, wherein every sensing unit has a positive excitation input terminal, a negative excitation input terminal, a positive output terminal and a negative output terminal, the positive excitation input terminal of every sensing unit is connected with the positive excitation voltage, the negative excitation input terminal of every sensing unit is connected with the negative excitation voltage;

the positive output terminals of the sensing units at a same row of the pressure-sensitive sensor array are connected with each other and act as an output of the row;

the negative output terminals of the sensing units at a same column of the pressure-sensitive sensor array are connected with each other and act as an output of the column;

the whole pressure-sensitive sensor array has a positive excitation input end, a negative excitation input end, M row output signals and N column output signals.

The signal processing circuit further comprises an analog-digital convert circuit which comprises at least one analog-digital converter (ADC) for converting the row and column output signals of the sensor array to digital signals.

The analog-digital convert circuit further comprises an instrument amplifier located before the analog-digital converter for amplifying the row and column output signals of the sensor array and then sending to the analog-digital converter for conversion.

Any one of the row output signals and any one of the column output signals form a differential signal pair to be sent to the analog-digital converter for conversion.

The signal processing circuit further comprises a pseudo half-bridge circuit which has a positive excitation input end and a negative excitation input end respectively connected with the positive and negative excitation voltages; wherein the pseudo half-bridge circuit has an output signal which is determined by the positive and negative excitation voltages of the excitation source and does not change with pressure; any one of the row and column output signals and the output signal of the pseudo half-bridge circuit form a signal pair to be sent to the analog-digital convert circuit for conversion.

The present invention also provides a signal processing method of a signal processing circuit with a pressure-sensitive sensor array, comprising steps of:

(1) combining M row output signals with N column output signals to form M×N differential signal pairs;

(2) respectively sending the M×N differential signal pairs to an analog-digital convert circuit for conversion, and obtaining digital signals, wherein the conversion is made for M×N times;

(3) arranging the digital signals in sequence; and (4) taking a maximum of the digital signals as a pressure signal which is applied to the pressure-sensitive sensor array.

When M=1 or N=1, an average value, of former two digital signals of the digital signals arranged from big to small, is taken as the pressure signal which is applied to the pressure-sensitive sensor array; when M>1 and N>1, an average value, of former four digital signals of the digital signals arranged from big to small, is taken as the pressure signal which is applied to the pressure-sensitive sensor array.

The average value is multiplied by a preset coefficient which is larger than one to obtain the pressure signal applied to the pressure-sensitive sensor array; and the preset coefficient is related to a structure of the sensor and characteristics of a deformation body.

Furthermore, the present invention also provides a signal processing method of a signal processing circuit with a pressure-sensitive sensor array, comprising steps of:

(1) respectively combining M row output signals and N column output signals with an output signal of the pseudo half-bridge circuit to form multiple signal pairs;

(2) respectively converting the multiple signal pairs (assuming the output signal of the pseudo half-bridge circuit as a negative input) to an analog-digital convert circuit for conversion, and obtaining digital signal, wherein the conversion is made for M+N times;

(3) respectively arranging the digital signals in sequence according to a row output signal combination and a column output signal combination; and (4) respectively taking a maximum of the digital signals in the row output signal combination and a maximum of digital signals in the column output signal combination, and taking a difference value between the two maximums as a pressure signal which is applied to the pressure-sensitive sensor array.

When M=1 or N=1, an average value, of former two digital signals of the digital signals in the row (when N=1) or column (when M=1) output signal combination arranged from big to small, is taken as the pressure signal which is applied to the pressure-sensitive sensor array; when M>1 and N>1, the digital signals in the column output signal combination and the row output signal combination are respectively arranged from big to small, and then the former two digital signals of the digital signals in the row output signal combination arranged from big to small, and the former two digital signals of the digital signals in the column output signal combination arranged from big to small are taken, these four digital signals are subtracted from each other, so that four subtracted values are obtained, and then an average value of the four subtracted values is taken as the pressure signal which is applied to the pressure-sensitive sensor array.

The average value is multiplied by a preset coefficient which is larger than one to obtain the pressure signal applied to the pressure-sensitive sensor array; and the preset coefficient is related to a structure of the sensor and characteristics of a deformation body.

In spite that the row output signals are connected with the positive output terminal of the bridge of the sensing units, the column output signals are connected with the negative output terminal of the bridge of the sensing units; contrarily, the row output signals are connected with the negative output terminal of the bridge of the sensing units, the column output signals are connected with the positive output terminal of the bridge of the sensing units, which is feasible.

The signal processing circuit and method with a pressure-sensitive sensor array, which are capable of significantly decreasing an amount of output signal wires of the sensor, reducing connection areas, improving reliability, reducing inputting channels of subsequent chips, conversion times from analog signals to digital signals, and manufacturing cost and volume of the whole system.

These and other objectives, features, and advantages of the present invention will become apparent from the following detailed description, the accompanying drawings, and the appended claims.

DETAILED DESCRIPTION OF THE PREFERRED EMBODIMENT

To more clearly understand objectives, technical solutions and advantages, the present invention is further explained in detail accompanying with drawings and embodiments as follows. It should be understood that the specific embodiments described herein are merely for illustrating the present invention and are not intended to limit the present invention.

Figure 1:
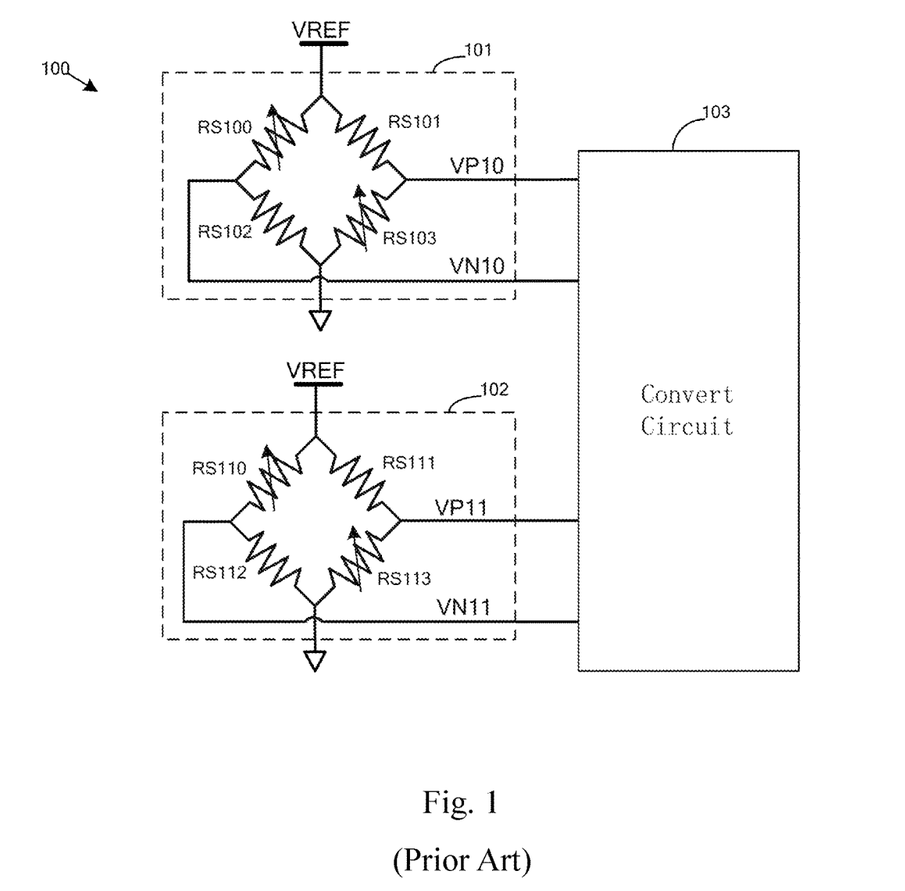
FIG. 1 is a circuit diagram of a conventional signal processing circuit with a pressure-sensitive sensor array.

Referring to FIG. 1, a common signal processing circuit 100 with a pressure-sensitive sensor array is illustrated. There are two pressure-sensitive sensing units 101 and 102 which have the same structure. Take the pressure-sensitive sensing unit 101 for example, it has a bridge circuit and comprises two resistive sensors RS100 and RS103, and two resistors RS101 and RS102, wherein: one end of the RS100 is connected with an excitation voltage positive terminal VREF, the other end of the RS100 is connected with one end of the RS102, the other end of the RS102 is connected with an excitation voltage negative terminal GND; one end of the RS101 is connected with the excitation voltage positive terminal VREF, the other end of the RS101 is connected with one end of the RS103, the other end of the RS103 is connected with the excitation voltage negative terminal GND. A common node of the RS101 and the RS103 outputs a positive voltage signal VP10, and a common node of the RS100 and the RS102 outputs a negative voltage signal VN10. The VP10 and VN10 form a differential signal pair and then are sent to an analog-digital convert circuit 103 for conversion. Furthermore, the pressure-sensitive sensing unit 102 outputs a differential signal pair formed by VP11 and VN11 to the analog-digital convert circuit 103.

It is obvious that the differential signal pairs outputted by the sensing units are respectively sent to the analog-digital convert circuit for conversion. One sensing unit has a differential signal pair, so that K sensing units have corresponding (2×K) signals. A signal amount is significantly increased with an increase of an amount of the sensing units.

Figure 2:
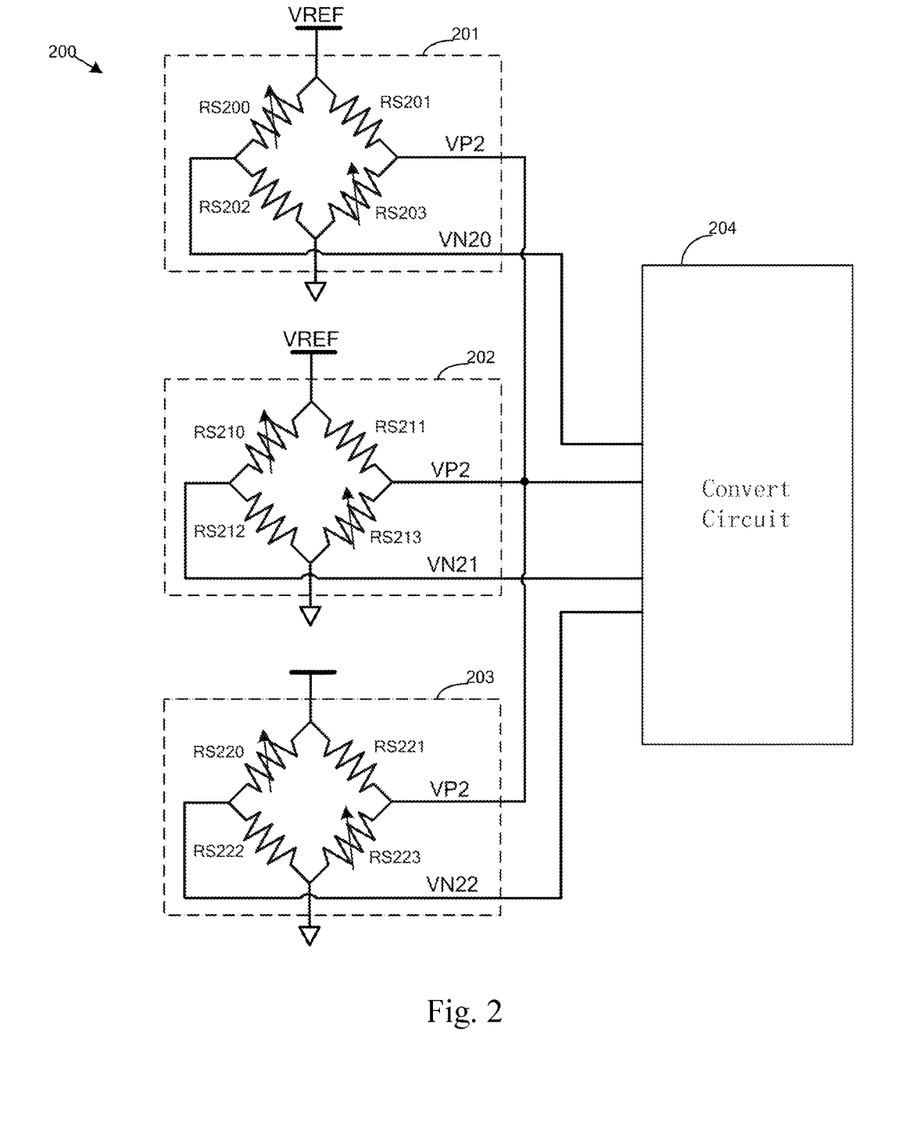
FIG. 2 is a circuit diagram of a signal processing circuit with a pressure-sensitive sensor array according to a first preferred embodiment of the present invention.

Referring to FIG. 2, a signal processing circuit 200 with a pressure-sensitive sensor array according to a first preferred embodiment of the present invention is illustrated, which comprises: three pressure-sensitive sensing units 201, 202 and 203 which define an array with 1 row and 3 columns, and an analog-digital convert circuit 204. All of the pressure-sensitive sensing units 201, 202 and 203 have the same structure with the pressure-sensitive sensing unit 101, and however, have different connection modes of positive and negative output signals from those shown in FIG. 1. The positive output signals of the pressure-sensitive sensing units 201, 202 and 203 are connected with each other for forming a voltage signal VP2, and the negative output signals of the pressure-sensitive sensing units 201, 202 and 203 are respectively VN20, VN21 and VN22. The signals VP2, VN20, VN21 and VN22 are sent to the analog-digital convert circuit for conversion.

Figure 3:
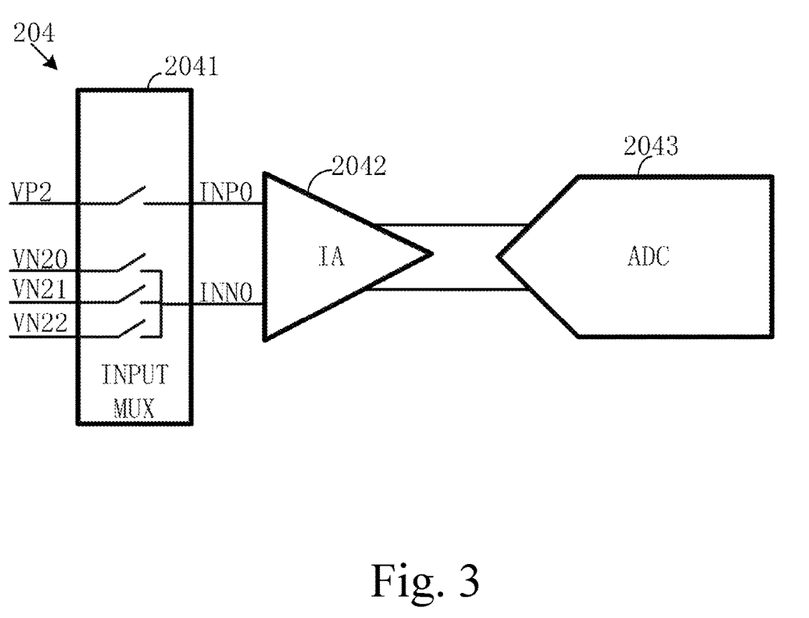
FIG. 3 is a circuit diagram of an analog-digital convert circuit 204 in the signal processing circuit shown in FIG. 2.

Referring to FIG. 3, a specific structure of the analog-digital convert circuit 204 in the signal processing circuit 200 for the pressure-sensitive sensor array is illustrated, which comprises a multiplexer 2041, an instrument amplifier 2042 and an analog-digital converter 2043. The signal VP2, which is outputted by the pressure-sensitive sensing units 201-203 and acts as a positive input signal INP0, is inputted to a positive input terminal of the instrument amplifier 2042 through the multiplexer 2041. The signals VN20-VN22 which act as a negative input signal INN0 are respectively inputted to a negative input terminal of the instrument amplifier 2042 through the multiplexer 2041. The signals INP0 and INN0 are amplified by the instrument amplifier 2042 amplifies and then sent to the analog-digital converter 2043, and the analog-digital converter 2043 converts inputted analog signals to digital signals for outputting.

Figure 4:
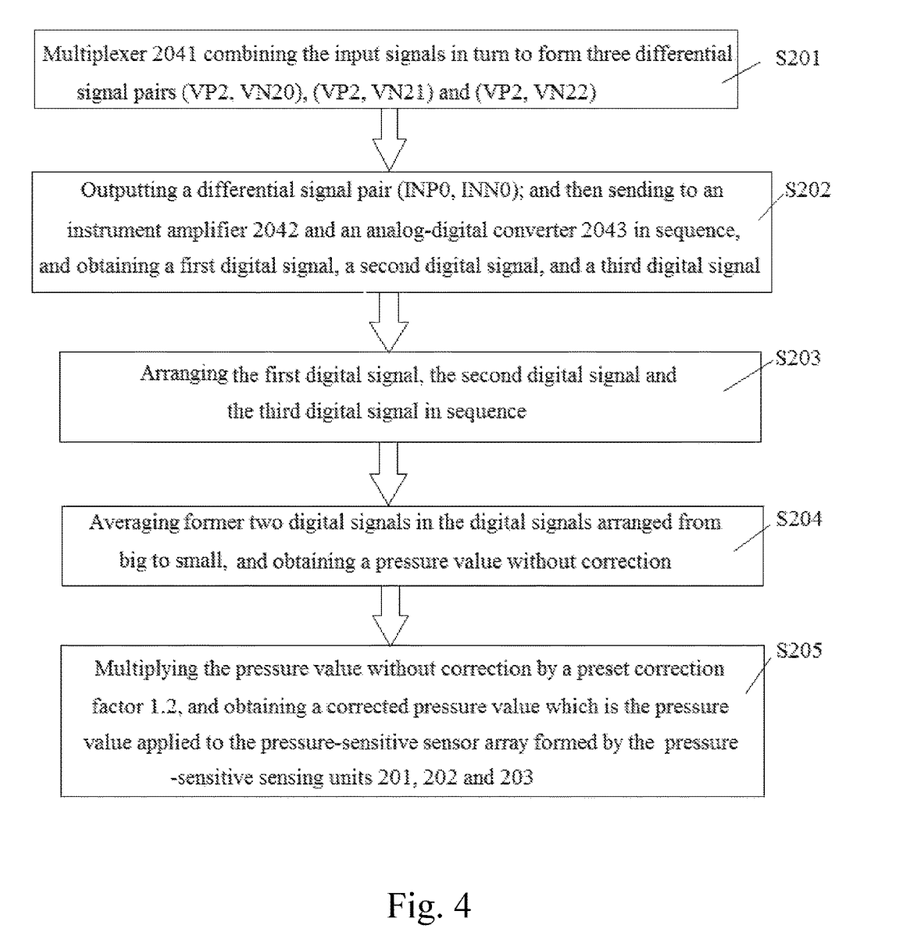
FIG. 4 is a flow chart of the conventional signal processing circuit in FIG. 2.

Referring to FIG. 4, a signal processing method corresponding to the signal processing circuit 200 with the pressure-sensitive sensor array is illustrated, which comprises steps of:

step (S201): the multiplexer 2041 combining the input signals in turn to form three differential signal pairs (VP2, VN20), (VP2, VN21) and (VP2, VN22), and outputting a differential signal pair (INP0, INN0);

step (S202): then sending the three differential signal pairs (VP2, VN20), (VP2, VN21) and (VP2, VN22) to the instrument amplifier 2042 and the analog-digital converter 2043 in sequence, and obtaining three digital signals, namely, a first digital signal, a second digital signal, and a third digital signal, wherein when the multiplexer 2041 combines one differential signal pair, the instrument amplifier 2042 and the analog-digital converter 2043 accordingly convert the differential signal pair; the combination and conversion are divided into two steps for further explanation;

step (S203): arranging the converted digital signals in sequence, wherein if a pressure application point is at the pressure-sensitive sensing unit 202 and nears the pressure-sensitive sensing unit 201, the converted digital signals are arranged, from big to small, as the second digital signal, the first digital signal and the third digital signal;

step (S204): averaging former two digital signals, and obtaining a digital signal mean value 0 which is capable of representing a pressure value without correction; and step (S205): multiplying the digital signal mean value 0, obtained in the step (S204), by a preset correction factor 1.2, and obtaining a final digital signal mean value 1 which is capable of representing a corrected pressure value.

Figure 5:
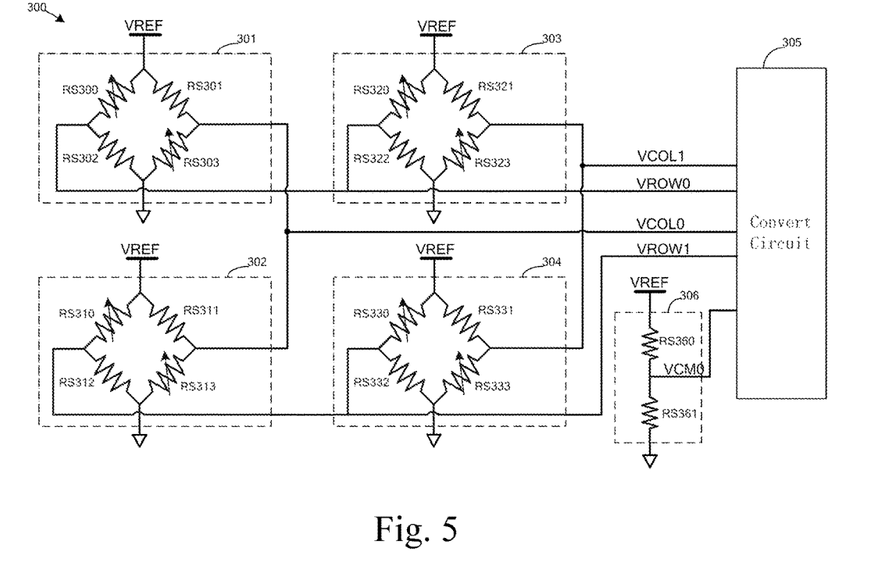
FIG. 5 is a circuit diagram of a signal processing circuit with a pressure-sensitive sensor array according to a second preferred embodiment of the present invention.

Referring to FIG. 5, a signal processing circuit 300 with a pressure-sensitive sensor array according to a second preferred embodiment of the present invention is illustrated, which comprises: four pressure-sensitive sensing units 301, 302, 303 and 304 which define an array with 2 rows and 2 columns, and an analog-digital convert circuit 305. All of the pressure-sensitive sensing units 301-304 have the same structure with the pressure-sensitive sensing unit 101, and however, have different connection modes of positive and negative output signals from those shown in FIG. 1. The positive output signals of the pressure-sensitive sensing units 301 and 303 at the first row of the array are connected with each other for forming a row output signal VROW0; the positive output signals of the pressure-sensitive sensing units 302 and 304 at the second row of the array are connected with each other for forming a row output signal VROW1; the negative output signals of the pressure-sensitive sensing units 301 and 302 at the first column of the array are connected with each other for forming a column output signal VCOL0; the positive output signals of the pressure-sensitive sensing units 303 and 304 at the second column of the array are connected with each other for forming a column output signal VCOL1.

Furthermore, a pseudo half-bridge circuit comprises resistors RS360 and RS361, wherein: an upper end of the resistor RS360 is connected with an excitation voltage positive terminal VREF, a lower end thereof is connected with an upper end of the resistor RS361; a lower end of the resistor RS361 is connected with an excitation voltage negative terminal GND. A combination point of the resistor RS360 and the resistor RS361 outputs a common mode voltage signal VCM0.

The above signals VROW0, VROW1, VCOL0 and VCOL1 are sent to the analog-digital convert circuit 305 for analog-to-digital conversion.

Figure 6:
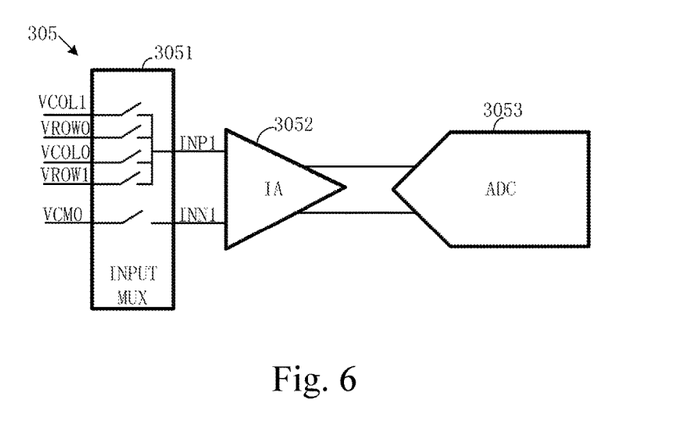
FIG. 6 is a circuit diagram of an analog-digital convert circuit 305 in the signal processing circuit shown in FIG. 5.

FIG. 6 shows a specific structure of the analog-digital convert circuit 305 in the signal processing circuit 300 with the pressure-sensitive sensor array is illustrated, which comprises a multiplexer 3051, an instrument amplifier 3052 and an analog-digital converter 3053. The pressure-sensitive sensing units 301-304 output the row output signals VROW0 and VROW1, the column output signals VCOL0 and VCOL1, and the common mode voltage signal VCM0 to the multiplexer 3051, and then the multiplexer 3051 outputs signals INP1 and INN1 which act as a differential signal pair to the instrument amplifier 3052 for amplifying, and then the instrument amplifier 3052 sends the amplified signals to the analog-digital converter 3053, and then the analog-digital converter 3053 converts inputted analog signals to digital signals for outputting.

Figure 7:
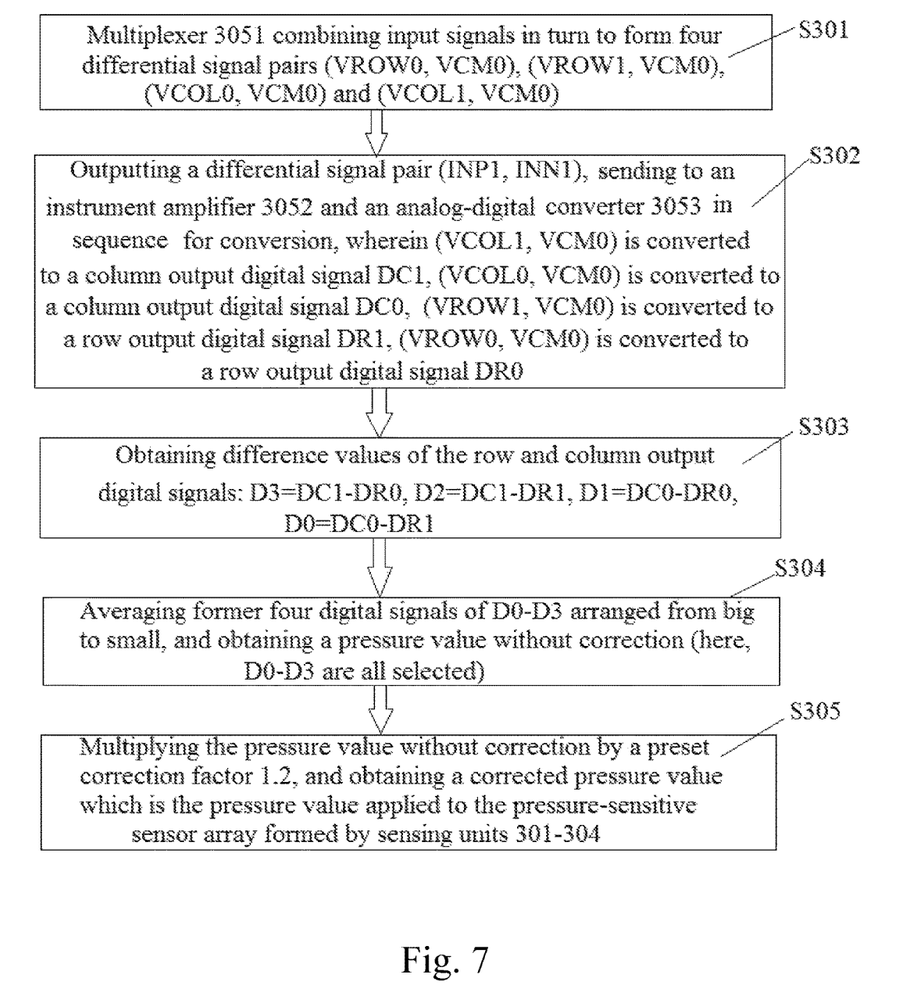
FIG. 7 is a flow chart of the signal processing circuit shown in FIG. 5.

Referring to FIG. 7, a signal processing method corresponding to the signal processing circuit 300 with the pressure-sensitive sensor array is illustrated, which comprises steps of:

step (S301): the multiplexer 3051 combining input signals in turn to form four differential signal pairs (VROW0, VCM0), (VROW1, VCM0), (VCOL0, VCM0) and (VCOL1, VCM0), and outputting a differential signal pair (INP1, INN1);

step (S302): converting the four differential signal pairs (VROW0, VCM0), (VROW1, VCM0), (VCOL0, VCM0) and (VCOL1, VCM0) by the instrument amplifier 3052 and the analog-digital converter 3053 in sequence, and obtaining four digital signals, namely, DR0, DR1, DC0 and DC1, wherein when the multiplexer 3051 combines one differential signal pair, the instrument amplifier 3052 and the analog-digital converter 3053 accordingly convert the differential signal pair; the combination and conversion are divided into two steps for further explanation;

step (S303): arranging the converted digital signals in sequence, wherein an arrangement result, from big to small, is DC0, DR0, DR1 and DC1 in sequence;

step (S304): averaging former four digital signals, and obtaining a digital signal mean value 2 which is capable of representing a pressure value without correction; and step (S305): multiplying the digital signal mean value 2, obtained in the step (S304), by a preset correction factor 1.2, and obtaining a final digital signal mean value 3 which is capable of representing a corrected pressure value applied to the pressure-sensitive sensing units 301-304.

The above cited sensor array is 2×2, which has not obvious improvement on connection and conversion steps, compared with conventional solutions. However, if the sensor array is 4×4, an amount of connections of the output signals of the sensor array is decreased from 32 to 8, and a conversion time is decreased from original 32 to 8, which shows a very large decrease extent.

Moreover, in spite that the resistive pressure-sensitive sensors are explained in above embodiments, the structure provided by the present invention is also adapted for the capacitive and piezoelectric pressure-sensitive sensors.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A signal processing circuit with a pressure-sensitive sensor array comprising: a pressure-sensitive sensor array with M rows and N columns, an excitation source adapted for outputting positive and negative excitation voltages, and an analog-digital convert circuit, wherein:

the pressure-sensitive sensor array comprises M×N sensing units which are connected with each other through a bridge manner, wherein every sensing unit has a positive excitation input terminal, a negative excitation input terminal, a positive output terminal and a negative output terminal, the positive excitation input terminal of every sensing unit is connected with the positive excitation voltage, the negative excitation input terminal of every sensing unit is connected with the negative excitation voltage;

the positive output terminals of the sensing units at a same row of the pressure-sensitive sensor array are connected with each other and act as an output of the row;

the negative output terminals of the sensing units at a same column of the pressure-sensitive sensor array are connected with each other and act as an output of the column;

the whole pressure-sensitive sensor array has a positive excitation input end, a negative excitation input end, M row output signals and N column output signals;

the analog-digital convert circuit comprises at least one analog-digital converter for converting the row and column output signals of the sensor array to digital signals;

the signal processing circuit further comprises a pseudo half-bridge circuit which has a positive excitation input end and a negative excitation input end respectively connected with the positive and negative excitation voltages; wherein the pseudo half-bridge circuit has an output signal which is determined by the positive and negative excitation voltages of the excitation source; any one of the row and column output signals and the output signal of the pseudo half-bridge circuit form a signal pair to be sent to the analog-digital convert circuit for conversion.

\* \* \* \* \*